United States Patent
Choi et al.

(10) Patent No.: US 12,311,862 B2
(45) Date of Patent: May 27, 2025

(54) MOUNTING PLATE AND COVER ASSEMBLY FOR STEERING WHEEL INCLUDING THE SAME

(71) Applicant: HYUNDAI MOBIS CO., LTD., Seoul (KR)

(72) Inventors: Jung Geun Choi, Yongin-si (KR); Jeong Mo Heo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/519,255

(22) Filed: Nov. 27, 2023

(65) Prior Publication Data

US 2024/0416860 A1      Dec. 19, 2024

(30) Foreign Application Priority Data

Jun. 19, 2023   (KR) ........................ 10-2023-0078036

(51) Int. Cl.
*B60R 21/203*     (2006.01)
(52) U.S. Cl.
CPC ............................... *B60R 21/2037* (2013.01)
(58) Field of Classification Search
None
See application file for complete search history.

(56) References Cited

U.S. PATENT DOCUMENTS

| | | | |
|---|---|---|---|
| 5,816,608 A | * | 10/1998 | Tanabe .................. B60R 21/217 280/728.2 |
| 8,733,203 B2 | * | 5/2014 | Kondo ................... B60Q 5/003 74/552 |
| 11,390,233 B2 | * | 7/2022 | Kwon .................... B60R 21/203 |
| 2020/0130630 A1 | * | 4/2020 | Schmeier .......... B60R 21/21658 |
| 2022/0063518 A1 | | 3/2022 | Kim et al. |

OTHER PUBLICATIONS

Extended European Search Report issued May 7, 2024 in corresponding European Patent Application No. 23213729.9.

* cited by examiner

*Primary Examiner* — Vicky A Johnson
(74) *Attorney, Agent, or Firm* — NovoTechIP International PLLC (57) ABSTRACT

A mounting plate and a cover assembly for a steering wheel, which cover assembly includes the mounting plate, are provided. The mounting plate is configured so that a hook of the mounting plate does not directly press an inner cover of the cover assembly. The mounting plate includes a plate body provided to form an exterior of the mounting plate, the hook being configured to protrude from an outer surface of the plate body to penetrate an outer cover and the inner cover of the cover assembly. A rib is also provided which is configured to form an entry space for the hook to enter between the plate body and the inner cover by pressing the inner cover during assembly.

8 Claims, 6 Drawing Sheets

MOUNTING PLATE AND COVER ASSEMBLY FOR STEERING WHEEL INCLUDING THE SAME

CROSS-REFERENCE TO RELATED APPLICATIONS

This application claims priority to and the benefit of Korean Patent Application No. 10-2023-0078036, filed on 19 Jun. 2023, the disclosure of which is incorporated herein by reference in its entirety.

TECHNICAL FIELD

The present invention relates to a mounting plate and a cover assembly for a steering wheel including the same.

BACKGROUND

In general, a steering wheel, which is responsible for steering a vehicle, may be equipped with an airbag that deploys toward a driver when a vehicle collision accident occurs, a horn device that honks a horn, or a lighting device that illuminates an emblem disposed on the steering wheel.

Therefore, a hole having an accommodation space may be formed in the steering wheel to accommodate various devices inside the steering wheel, and a cover assembly may be coupled to the steering wheel to cover the hole formed in the steering wheel.

The cover assembly coupled to the steering wheel may include an outer cover that closes a cover of the steering wheel and whose outer surface is exposed toward a passenger compartment, an inner cover that is disposed inside the outer cover and emits light to illuminate the emblem disposed on the outer cover, and a mounting plate that is coupled to the inner cover and accommodates an airbag or a lighting device therein.

Here, the mounting plate may be a component coupled to the inner cover by entering the inside of the outer cover after the inner cover is coupled to the outer cover, and thereby, a hook disposed on an outer surface of the mounting plate may be fixed to the outer cover and the inner cover by passing through a hole formed in the outer cover and the inner cover.

However, a cover assembly in the related art has a problem in that damage such as crushing of the inner cover occurs due to a phenomenon in which the hook presses the inner cover as the mounting plate enters the inside of the outer cover, and thus a defective product is produced. Therefore, there is a need for structural improvement so that the hook of the mounting plate does not directly press the inner cover.

SUMMARY

The present invention is directed to providing a mounting plate improved so that a hook of the mounting plate does not directly press an inner cover and a cover assembly for a steering wheel including the same.

According to an aspect of the present invention, there is provided a mounting plate accommodating an airbag or a lighting device and coupled to an outer cover and an inner cover therein, the mounting plate including a plate body provided to form an exterior, a hook configured to protrude from an outer surface of the plate body to penetrate the outer cover and the inner cover, and a rib configured to form an entry space for the hook to enter between the plate body and the inner cover by pressing the inner cover during assembly.

The rib may be disposed to be inclined with respect to the plate body and include an inclined surface contacting an edge of the inner cover.

The inclined surface may have a shape in which a size of a cross-sectional area gradually decreases along a direction in which the mounting plate is coupled to the inner cover.

The rib may be formed integrally with the plate body and the hook.

The rib may be detachably disposed on the plate body and the hook.

According to another aspect of the present invention, there is provided a cover assembly for a steering wheel for covering an airbag or a lighting device mounted in an inner space of the steering wheel, the cover assembly including an outer cover coupled to the steering wheel and covering the inner space, an inner cover coupled to the outer cover and disposed on an inner surface of the outer cover, and a mounting plate accommodating the airbag or the lighting device therein and coupled to the outer cover and the inner cover, wherein the mounting plate includes a plate body provided to form an exterior, a hook configured to protrude from an outer surface of the plate body to penetrate the outer cover and the inner cover, and a rib configured to form an entry space of the hook between the plate body and the inner cover by pressing the inner cover during assembly.

The rib may be disposed to be inclined with respect to the plate body and include an inclined surface contacting an edge of the inner cover.

The inclined surface may have a shape in which a size of a cross-sectional area gradually decreases along a direction in which the mounting plate is coupled to the inner cover.

The inner cover may include a support portion disposed parallel to the inclined surface to support the inclined surface when the hook is coupled to the outer cover and the inner cover through the entry space.

The outer surface of the plate body of the mounting plate may come into contact with an inner surface of the inner cover when the inclined surface of the rib comes into contact with the support portion.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Since the present invention may be variously modified and embodied, particular embodiments thereof will be illustrated in the drawings and described. However, this is not intended to limit the present invention to the specific embodiments, and it should be understood to include all modifications, equivalents, and substitutes included in the spirit and scope of the present invention.

Although the terms including ordinal numbers such as first, second, or the like, may be used to describe various elements, these elements are not limited by these terms. These terms are only used to distinguish one element from another element. For example, without departing from the scope of the present invention, a second element could be called a first element, and similarly, a first element could be called a second element. The term "and/or" includes a combination of a plurality of related listed items or any of a plurality of related listed items.

It will be understood that when an element is referred to as being "coupled" or "connected" to another element, the element may be directly coupled or connected to the other element, or intervening elements may also be present. In contrast, it will be understood that when an element is referred to as being "directly coupled" or "directly connected" to another element, there are not intervening elements present.

In the description of embodiments, when one element is described as being formed "on" or "under" another element, "on" or "under" includes both a case in which the two elements are directly in contact with each other and a case in which at least one additional element is formed to be disposed between the two elements (indirectly). Further, when expressed as "on or under", the expression may include the meaning of not only an upward direction but also a downward direction based on one element.

The terms used in the present application are merely provided to describe specific embodiments, and are not intended to limit the present invention. The singular forms are intended to include the plural forms as well, unless the context clearly indicates otherwise. In the present application, it will be further understood that the terms "includes" and/or "have", when used in this specification, specify the presence of stated features, integers, steps, operations, elements, components, and/or combinations thereof, but do not preclude the possibility of the presence or addition of one or more other features, integers, steps, operations, elements, components, or combinations thereof.

Unless otherwise defined, all terms used herein, including technical or scientific terms, have the same meaning as commonly understood by those of ordinary skill in the art to which the present invention belongs. Terms, such as those defined in commonly used dictionaries, should be interpreted as having a meaning that is consistent with their meaning in the context of the related art and will not be interpreted in an idealized or overly formal sense unless expressly so defined herein.

Hereinafter, a mounting plate and a cover assembly for a steering wheel including the same will be described in detail with reference to the accompanying drawings, but identical or corresponding components are denoted by the same reference numerals regardless of figure numbers, and redundant descriptions thereof will be omitted.

Figure 1:
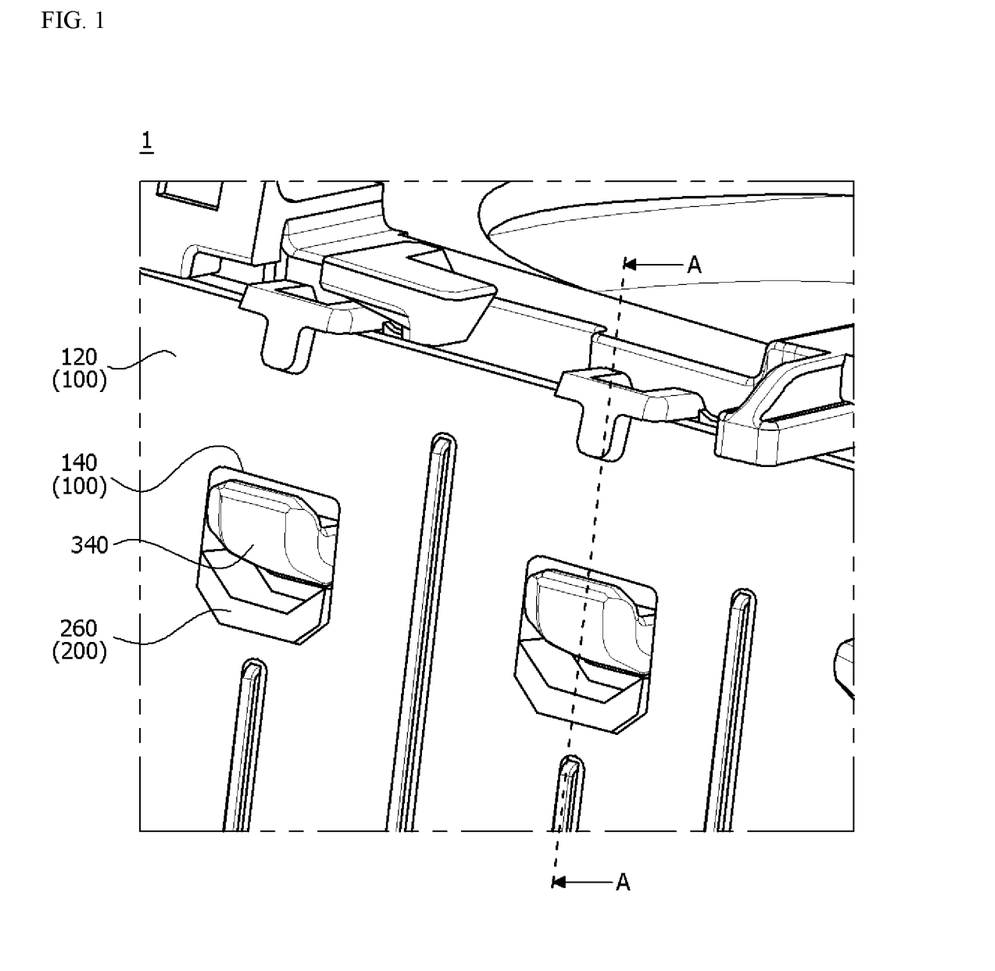
FIG. 1 is an enlarged view of a portion where respective components of a cover assembly for a steering wheel according to one embodiment of the present invention are coupled.
Figure 2:
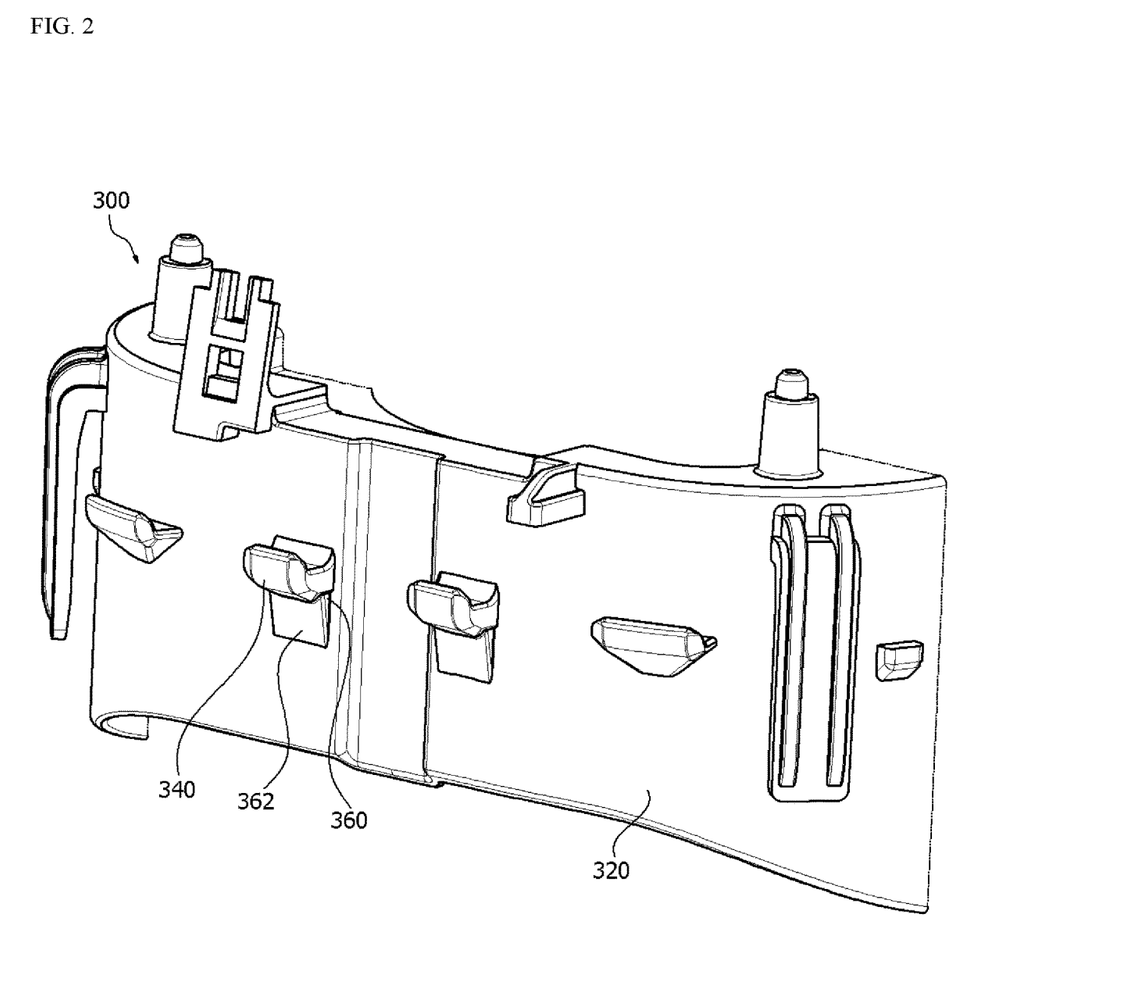
FIG. 2 is a diagram illustrating a hook and a rib of a mounting plate.
Figure 3:
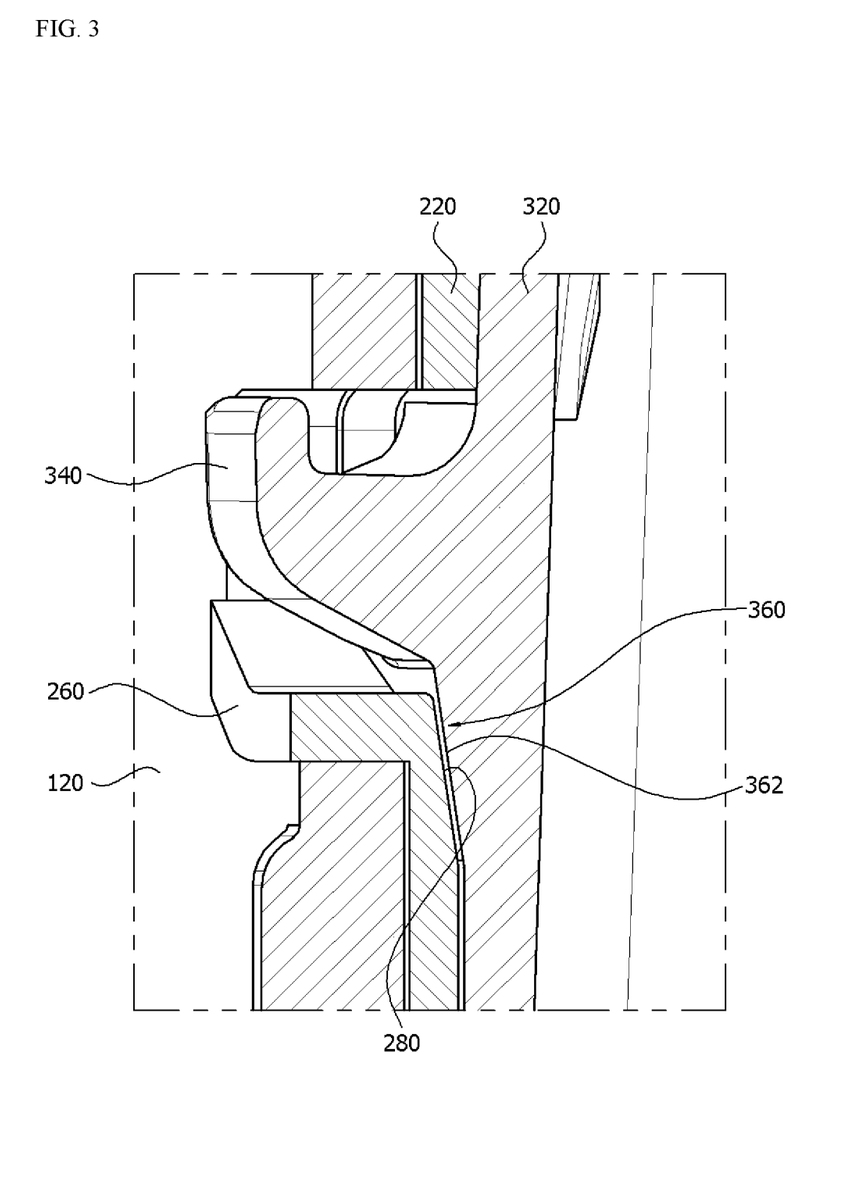
FIG. 3 is a cross-sectional view taken along line A-A in FIG. 1.
Figure 4:
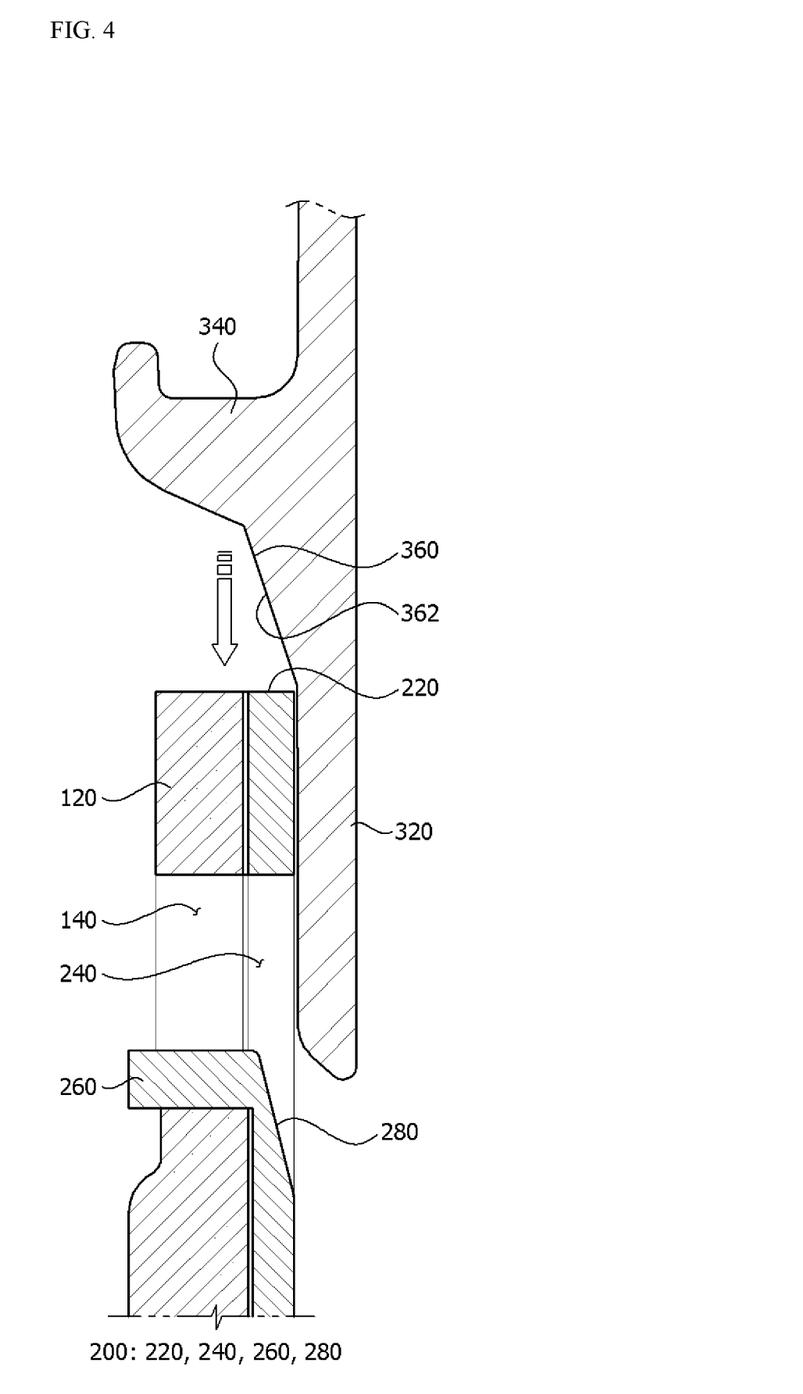
FIG. 4 is a diagram illustrating a state before the mounting plate is coupled to an inner cover.
Figure 5:
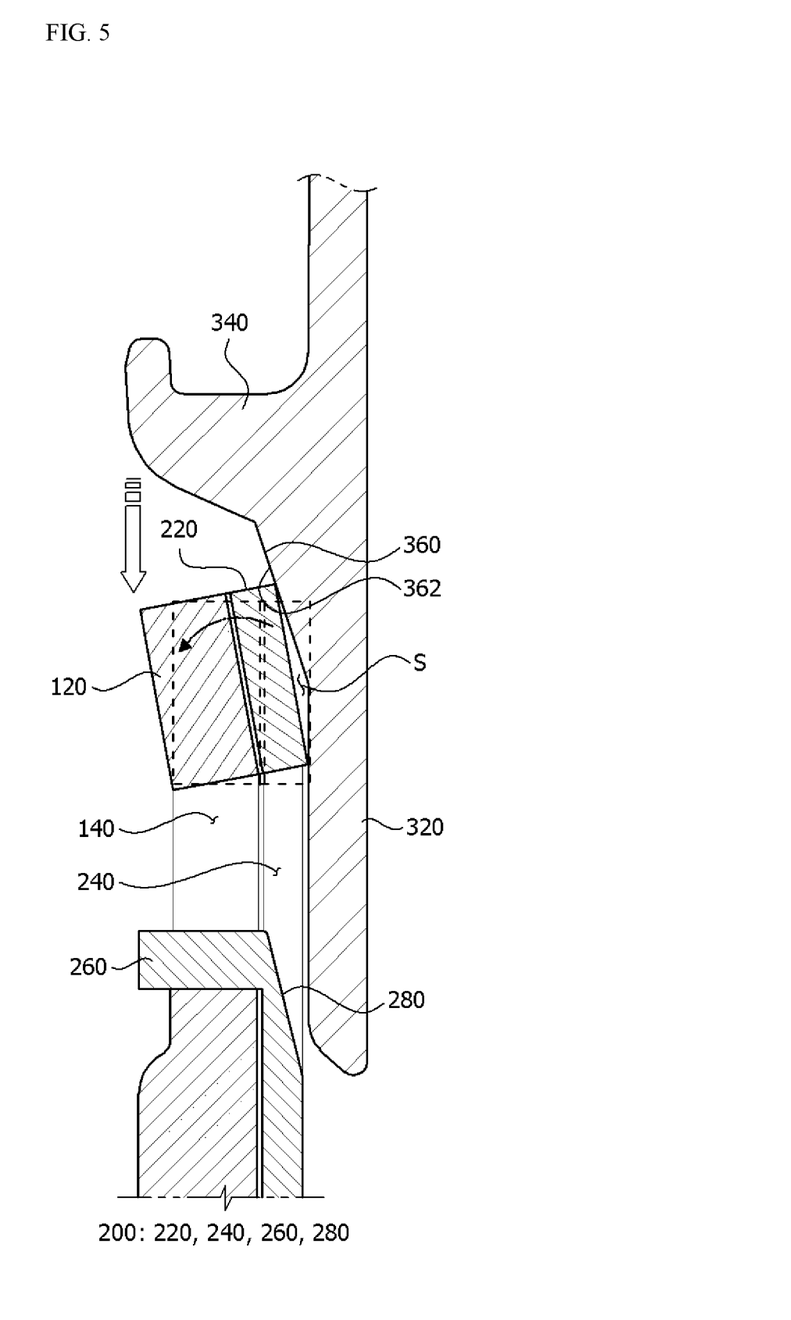
FIG. 5 is a diagram illustrating a state where the rib presses the inner cover.

FIG. 1 is an enlarged view of a portion where respective components of a cover assembly for a steering wheel according to one embodiment of the present invention are coupled, FIG. 2 is a diagram illustrating a hook and a rib of a mounting plate, FIG. 3 is a cross-sectional view taken along line A-A in FIG. 1, FIG. 4 is a diagram illustrating a state before the mounting plate is coupled to an inner cover, and FIG. 5 is a diagram illustrating a state where the rib presses the inner cover.

Referring to FIGS. 1 to 5, a cover assembly 1 for a steering wheel according to one embodiment of the present invention may be coupled to the steering wheel to close an inner space of the steering wheel. That is, the cover assembly 1 for a steering wheel may cover an airbag or a lighting device mounted in the inner space of the steering wheel. The cover assembly 1 for a steering wheel includes an outer cover 100 that is coupled to the steering wheel and covers the inner space, an inner cover 200 that is coupled to the outer cover 100 and disposed on an inner surface of the outer cover 100, and a mounting plate 300 that accommodates the airbag or the lighting device therein and is coupled to the outer cover 100 and the inner cover 200.

The outer cover 100 may accommodate the inner cover 200 and the mounting plate 300 therein. The outer cover 100 may include a first cover body 120 and a first accommodation hole 140.

The first cover body 120 may form the exterior of the outer cover 100. The first cover body 120 may be constituted by combination of a first side plate surrounding the inner cover 200 and the mounting plate 300, and a first cover plate covering one open side of the first side plate.

The first accommodation hole 140 may be formed in the first side plate of the first cover body 120. A plurality of first accommodation holes 140 may be formed in the first side plate. The first accommodation hole 140 may accommodate a stopper 260 of the inner cover 200 to be described below and a support portion 280 of the mounting plate 300 to be described below.

The inner cover 200 may be disposed on an inner surface of the first cover plate and an inner surface of the first side plate of the outer cover 100. The inner cover 200 may be disposed inside the outer cover 100 to emit light toward the outer cover 100. The inner cover 200 may include a second cover body 220, a second accommodation hole 240, and the stopper 260.

The second cover body 220 may form the exterior of the inner cover 200. The second cover body 220 may be constituted by combination of a second side plate coupled to the first side plate of the first cover body 120 of the outer cover 100 and a second cover plate coupled to the first cover plate.

The second accommodation hole 240 may be formed in the second side plate of the second cover body 220. A plurality of second accommodation holes 240 may be formed in the second side plate. When the inner cover 200 is coupled to the outer cover 100, the second accommodation hole 240 may be disposed in a position where the second accommodation hole 240 communicates with the first accommodation hole 140 of the outer cover 100. The second accommodation hole 240 may accommodate the support portion 280 of the mounting plate 300 to be described below together with the first accommodation hole 140.

The stopper 260 may have a shape that protrudes from an outer surface of the second cover body 220 to the outside of the second cover body 220. When the inner cover 200 is coupled to the outer cover 100, the stopper 260 may pass through the first accommodation hole 140 of the outer cover 100 and protrude to the outside of the outer cover 100. The stopper 260 may prevent the inner cover 200 coupled to the outer cover 100 from being separated. In addition, when the mounting plate 300 is coupled to the inner cover 200, the stopper 260 may block movement of a hook 340 so that the hook 340 does not descend further along a direction in which the mounting plate 300 is coupled to the inner cover 200.

The mounting plate 300 may be accommodated inside the outer cover 100. The mounting plate 300 may accommodate an inflator for generating gas therein in addition to the airbag or the lighting device. The mounting plate 300 may include a plate body 320, the hook 340, and a rib 360.

The plate body 320 may form the exterior of the mounting plate 300. The plate body 320 may be constituted by combination of a third side plate disposed adjacent to the second side plate of the inner cover 200 and a third cover plate having a shape bent from an end of the third side plate and disposed adjacent to the second cover plate of the inner cover 200. An open portion of the plate body 320 may be closed by the second cover plate of the inner cover 200 and the first cover plate of the outer cover 100.

The hook 340 may be placed on an outer surface of the plate body 320. More specifically, the hook 340 may be disposed on an outer surface of the third side plate of the plate body 320. The hook 340 protrudes from the outer surface of the plate body 320 (the outer surface of the third side plate) and may have a hook shape.

The hook 340 may penetrate the outer cover 100 and the inner cover 200 when the mounting plate 300 is coupled to the inner cover 200. More specifically, the hook 340 may pass through the first accommodation hole 140 of the outer cover 100 and the second accommodation hole 240 of the inner cover 200 and protrude to the outside of the outer cover 100. Thereby, the mounting plate 300 may be maintained in a state of being coupled to the outer cover 100 and the inner cover 200.

The rib 360 may be disposed on the outer surface of the third side plate of the plate body 320. The rib 360 may be connected to the third side plate and an outer surface of the rib 360 in a state of being disposed on the outer surface of the third side plate. That is, the rib 360 may be formed integrally with the plate body 320 and the hook 340.

The rib 360 may include an inclined surface 362. The inclined surface 362 may be one component of the rib 360 that is exposed to the outside of the mounting plate 300. The inclined surface 362 may be disposed to be inclined with respect to the plate body 320. More specifically, the rib 360 may have an inclined shape with respect to the outer surface of the third side plate of the plate body 320. The inclined surface 362 may have a shape in which a size of a cross-sectional area gradually decreases along a direction in which the mounting plate 300 is coupled to the inner cover 200.

In the following, a process in which the hook 340 is disposed in the first accommodation hole 140 and the second accommodation hole 240 through the inclined surface 362 will be described.

Referring back to FIGS. 3 to 5, the rib 360 may form an entry space S of the hook 340 between the plate body 320 and the inner cover 200 by pressing the inner cover 200 during assembly (a process in which the mounting plate 300 is coupled to the inner cover 200). As illustrated in FIG. 3, the inclined surface 362 of the rib 360 comes into contact with the edge of the inner cover 200 in a process in which the mounting plate 300 enters the inside of the outer cover 100. Thereby, as in the process of moving from FIG. 4 to FIG. 5, the inclined surface 362 of the rib 360 presses the inner cover 200 and pushes the inner cover 200 in a direction from the inner cover 200 toward the outer cover 100.

In this case, since the inclined surface 362 has a shape in which the size of the cross-sectional area gradually decreases along the direction in which the mounting plate 300 is coupled to the inner cover 200, as the mounting plate 300 enters the inside of the outer cover 100, the space (entry space S) between the inner cover 200 and the mounting plate 300 becomes increasingly wider. Accordingly, the hook 340 disposed on the outer surface of the plate body 320 enters the entry space S formed between the inner cover 200 and the mounting plate 300, and finally, the hook 340 enters the first accommodation hole 140 and the second accommodation hole 240.

In this way, the cover assembly 1 for a steering wheel according to one embodiment of the present invention may have a structure in which the hook 340 enters the first accommodation hole 140 and the second accommodation hole 240 without damaging the inner cover 200 by the rib 360 compared to the existing structure in which the hook 340 does not enter the first accommodation hole 140 and the second accommodation hole 240 due to a phenomenon such as crushing of the end of the inner cover 200 by being pressed by the hook 340 when the mounting plate 300 enters the inside of the outer cover 100. Therefore, assembly defects may be prevented, thereby reducing defective product disposal costs and reducing assembly costs.

Meanwhile, the inner cover 200 may include the support portion 280. The support portion 280 may be formed over the inner surface of the second cover body 220 of the inner cover 200 and the stopper 260. The support portion 280 may be disposed to be inclined with respect to the inner surface of the second cover body 220. The support portion 280 may support the inclined surface 362 of the mounting plate 300 when the hook 340 is coupled to the outer cover 100 and the inner cover 200 through the entry space S. In this case, the support portion 280 may be disposed parallel to the inclined surface 362.

Thereby, when the inclined surface 362 of the rib 360 comes into contact with the support portion 280, the outer surface of the plate body 320 of the mounting plate 300 may come into contact with the inner surface of the inner cover 200. That is, as illustrated in FIG. 3, since the rib 360 prevents a space from being formed between the inner cover 200 and the mounting plate 300 in a state where the inner cover 200 and the mounting plate 300 are coupled, shaking of the mounting plate 300 may be prevented, thereby securing the stability of the the cover assembly 1 for a steering wheel, and noise caused by the shaking of the mounting plate 300 may be prevented, thereby securing quietness.

Figure 6:
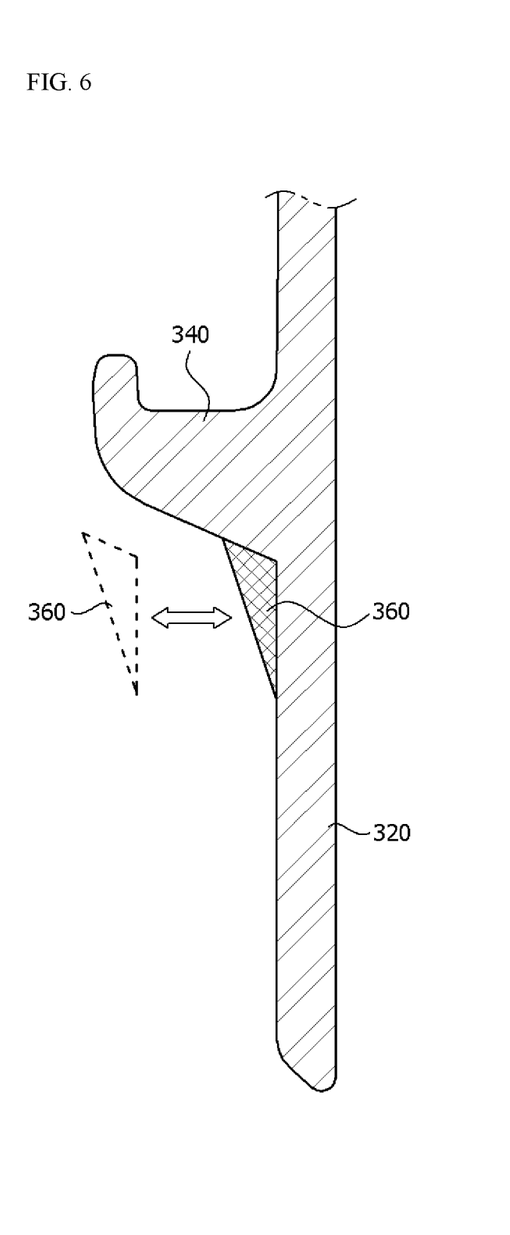
FIG. 6 is a diagram illustrating a rib according to another embodiment.

FIG. 6 is a diagram illustrating a rib according to another embodiment.

Referring to FIG. 6, a rib 360 may be detachably disposed on a plate body 320 and a hook 340. That is, the rib 360 may be provided separately from the plate body 320 and the hook 340. For example, a coupling protrusion may be formed on the rib 360 and a coupling groove for accommodating the coupling protrusion may be formed on the plate body 320 and the hook 340, so that the coupling protrusion is accommodated in the coupling groove, thereby coupling the rib 360 to the plate body 320 and the hook 340.

Accordingly, the rib 360 may be provided with an inclined surface 362 having various angles that is able to press an inner cover 200. Therefore, the shape of the rib 360 may be appropriately modified according to the shape of a mounting plate 300 or the inner cover 200, which is disposed inside the steering wheel and has a different shape.

According to one embodiment of the present invention, since a rib disposed below a hook presses an inner cover and thus a space for the hook to enter is formed between the inner cover and a mounting plate, occurrence of defective products that are likely to occur when the hook presses the inner cover can be prevented.

Although the embodiments of the present invention have been described above, it is understood that one ordinary skilled in the art can make various changes and modifications to the present invention without departing from the spirit and scope of the present invention as hereinafter claimed. Further, it should be construed that differences associated with such changes and modifications fall within the scope of the present invention defined by the accompanying claims.

What is claimed is:

1. A mounting plate accommodating an airbag or a lighting device therein and coupled to an outer cover and an inner cover of a cover assembly for a steering wheel, the mounting plate comprising:
    a plate body provided to form an exterior of the mounting plate;
    a hook configured to protrude from an outer surface of the plate body to penetrate the outer cover and the inner cover; and
    a rib having an inclined surface extending from a lower surface of the hook to the outer surface of the plate body to form an entry space for the hook to enter between the plate body and the inner cover, wherein the inclined surface of the rib is configured to push the inner cover of the cover assembly with the inclined surface of the rib in a direction from the inner cover toward the outer cover when the hook is pushed through the inner and outer covers of the cover assembly.

2. The mounting plate of claim 1, wherein the inclined surface has a shape in which a size of a cross-sectional area of the shape gradually decreases along a direction in which the mounting plate is coupled to the inner cover.

3. The mounting plate of claim 1, wherein the rib is formed integrally with the plate body and the hook.

4. The mounting plate of claim 1, wherein the rib is detachably disposed on the plate body and the hook.

5. A cover assembly for a steering wheel configured to cover an airbag or a lighting device mounted in an inner space of the steering wheel, the cover assembly comprising:
    an outer cover coupled to the steering wheel and covering the inner space of the steering wheel;
    an inner cover coupled to the outer cover and disposed on an inner surface of the outer cover; and
    a mounting plate accommodating the airbag or the lighting device therein and coupled to the outer cover and the inner cover,
    wherein the mounting plate includes:
    a plate body provided to form an exterior of the mounting plate, wherein the inner cover is located between an outer surface of plate body and the inner surface of the outer cover;
    a hook configured to protrude from an outer surface of the plate body to penetrate the outer cover and the inner cover; and
    a rib having an inclined surface extending from a lower surface of the hook to the outer surface of the plate body to form an entry space for the hook to enter between the plate body and the inner cover of the cover assembly, wherein the inner cover of the cover assembly is pushed with the inclined surface of the rib in a direction from the inner cover toward the outer cover when the hook is pushed through the inner and outer covers of the cover assembly.

6. The cover assembly of claim 5, wherein the inclined surface has a shape in which a size of a cross-sectional area of the shape gradually decreases along a direction in which the mounting plate is coupled to the inner cover.

7. The cover assembly of claim 5, wherein the inner cover includes an inclined support portion disposed parallel to the inclined surface and configured to support the inclined surface when the hook is coupled to the outer cover and the inner cover through the entry space.

8. The cover assembly of claim 7, wherein the outer surface of the plate body of the mounting plate comes into contact with an inner surface of the inner cover when the inclined surface of the rib comes into contact with the support portion.

* * * * *